United States Patent
Vercauteren et al.

(10) Patent No.: US 8,600,134 B2
(45) Date of Patent: Dec. 3, 2013

(54) METHOD AND SYSTEM FOR PROCESSING IMAGES ACQUIRED IN REAL TIME THROUGH A MEDICAL DEVICE

(75) Inventors: Tom Vercauteren, Paris (FR); Aymeric Perchant, Fontenay Sous Bois (FR); Francois Lacombe, Chaville (FR); Nicolas Savoire, Paris (FR)

(73) Assignee: Mauna Kea Technologies, Paris (FR)

( * ) Notice: Subject to any disclaimer, the term of this patent is extended or adjusted under 35 U.S.C. 154(b) by 325 days.

(21) Appl. No.: 13/144,518

(22) PCT Filed: Jan. 29, 2010

(86) PCT No.: PCT/IB2010/000608
§ 371 (c)(1),
(2), (4) Date: Jul. 14, 2011

(87) PCT Pub. No.: WO2010/086751
PCT Pub. Date: Aug. 5, 2010

(65) Prior Publication Data
US 2011/0274325 A1 Nov. 10, 2011

Related U.S. Application Data

(60) Provisional application No. 61/148,724, filed on Jan. 30, 2009.

(51) Int. Cl.
*G06K 9/00* (2006.01)
(52) U.S. Cl.
USPC .......................................................... 382/128
(58) Field of Classification Search
None
See application file for complete search history.

(56) References Cited

U.S. PATENT DOCUMENTS

| | | | |
|---|---|---|---|
| 4,901,143 A | 2/1990 | Uehara et al. | |
| 5,270,810 A | 12/1993 | Nishimura | |
| 5,492,125 A * | 2/1996 | Kim et al. | 600/443 |
| 6,678,395 B2 * | 1/2004 | Yonover et al. | 382/103 |
| 8,094,900 B2 * | 1/2012 | Steines et al. | 382/128 |
| 2004/0189641 A1 | 9/2004 | Stephenson et al. | |
| 2005/0207668 A1 | 9/2005 | Perchant et al. | |
| 2007/0273930 A1 | 11/2007 | Berier et al. | |
| 2008/0045848 A1 | 2/2008 | Lacombe et al. | |

FOREIGN PATENT DOCUMENTS

| | | |
|---|---|---|
| JP | H0255480 A | 2/1990 |
| JP | H04341232 A | 11/1992 |
| JP | H0530460 A | 2/1993 |
| JP | H07246184 A | 9/1995 |
| JP | 2003-535659 A | 12/2003 |
| JP | 2006-509211 A | 3/2006 |
| JP | 2008-542758 A | 11/2008 |

OTHER PUBLICATIONS

International Search Report from PCT/IB2010/000608 dated Jul. 28, 2010 (3 pages).

(Continued)

*Primary Examiner* — Claire X Wang
(74) *Attorney, Agent, or Firm* — Osha Liang LLP

(57) ABSTRACT

A method for processing images acquired in real time through a medical device, said images being loaded into a buffer, comprising the steps of: stopping the loading of the images into the buffer, processing loaded images using an incremental algorithm, displaying successively intermediate results of the processing, resuming the loading and stopping the processing based on an evaluation of said intermediate results.

15 Claims, 9 Drawing Sheets

(56) References Cited

OTHER PUBLICATIONS

Written Opinion from PCT/IB2010/000608 dated Jul. 28, 2010 (9 pages).
N. Ayache et al.; "Processing and Mosaicing of Fibered Confocal Images"; 9th MICCAI Medical Image Computing and Computer-Assisted Inervention, Workshop on Microscopic Image Analysis in Viology; Oct. 1, 2006 (5 pages).
A. Zomet et al.; "Efficient Super-Resolution and Applications to Mosaics"; Pattern Recognition, Proceedings, 15th International Conference; IEEE Computer Society, Los Alamitos, California; Sep. 3-7, 2000; pp. 579-583 (5 pages).
M. Irani et al.; "Improving Resolution by Image Registration"; CVGIP Graphicla Models and Image Processing, Academic Press; vol. 53, No. 3; May 1, 1991; pp. 231-239 (9 pages).
Y. Sato et al.; "Measuring Microcirculation Using Spatiotemporal Image Analysis"; Computer Vision, Virtual Reality and Robotics in Medicine International Conference, CVRMED. Proceedings; Jan. 1, 1995; pp. 302-308 (7 pages).
Japanese Office Action for Japanese Patent Application No. 2011-547001, mailing date May 21, 2013 (5 pages).

\* cited by examiner

METHOD AND SYSTEM FOR PROCESSING IMAGES ACQUIRED IN REAL TIME THROUGH A MEDICAL DEVICE

BACKGROUND

1. Field of the Disclosure

The invention relates generally to image and video online processing and in particular to a system and method for processing images acquired in real time and especially images acquired through a medical device.

2. Background Art

Online processing of the data is critical for applications such as video surveillance, industrial inspection, robotics and biomedical imaging. For example, video processing may be of interest in endoscopy and endomicroscopy. Patent application US2005207668 presents for example a system to restore in real-time images acquired through a bundle of fiber-optics typically used in endomicroscopy.

Image and video processing techniques are commonly used in digital video acquisition devices. The main purpose of such algorithms is to extract useful information from data. This can mean anything from the simplest visualization enhancement to fully-automatic image-based decision making during surgery.

For example, during an endoscopy, the physician's attention might be caught by a specific detail of a video sequence from a given part of a tissue. In order to examine the interesting image, the physician may need said image to be processed. Online image processing may notably be run through real time processing or lagged-time processing. Real time processing may only be implemented when the processing time is shorter than the time between two images. Lagged-time processing may only be implemented when the processing can be completed within a time corresponding to a fixed number of images and requires to launch in parallel several processes. As lagged processing may lead to loosing the location of the investigated area on the tissue, common endoscopy systems provide a freeze function which enables to stop on a given image. By freezing upon demand the display, the physician is given more time to analyze the image and make a diagnosis. Freezing the video at the exact time asked by the physician may result in freezing a bad, blurred image. U.S. Pat. Nos. 4,901,143 and 5,270,810 propose a processing that selects a frozen image which is at the same time a good image and is close to the freezing time asked by the clinician. U.S. Pat. Nos. 4,901,143 and 5,270,810 also disclose freezing upon demand and address the issue of keeping the information contained in the part of the video sequence that occurs during the freeze period by using two parallel pipelines. However, common techniques are essentially limited by the inner quality or amount of information of the frozen images.

The present disclosure proposes a method and a system that enables to enhance information retrieval during ongoing video acquisitions.

SUMMARY OF CLAIMED SUBJECT MATTER

According to one aspect, embodiments described herein relate to a method for processing images acquired in real time through a medical device, said images being loaded into a buffer, comprising the steps of:
  stopping the loading of the images into the buffer,
  processing loaded images using an incremental algorithm,
  displaying successively intermediate results of the processing,
  resuming the loading and stopping the processing based on an evaluation of said intermediate results.

This enables to take advantage of a freeze period for running some computationally intensive processing scheme that may not be able to be run in real time. Incremental algorithms are composed of different subroutines that need to be run one after the other. The result of each subroutine (i.e. an intermediate result) may be of interest in itself. Incremental algorithms may be for example used to find approximate solutions to problems for which exact solutions cannot be found or cannot be found in a reasonable amount of time such as nondeterministic polynomial-time hard problems for example. Each intermediate result may provide an approximate solution and is thus of interest. The more steps can be performed, the closer the approximate solution will be to the exact solution as results are improved from one step to the other. Medical devices to acquire images may be any device known to one of ordinary skill in the art including, but not limited to: endomicroscopes, classical endoscopy, High Definition endoscopy, Narrow Band Imaging endoscopy, FICE® endoscopy, double-balloon enteroscopy, zoom endoscopy, Cellvizio®, 2D/3D ultrasound imaging or any other non irradiative interventional modality. The images processed may be consecutive images from a video sequence or may be a subset of any loaded images.

According to a second aspect, embodiments described therein relate to an imaging system comprising:
  a medical device for acquiring images,
  a storage device comprising a buffer for loading said images,
  a processor for processing images,
  a display device,
  wherein:
  the processor processes loaded images using an incremental algorithm after the loading is stopped, intermediate results of said algorithm are displayed successively by the display device and the loading is resumed based on an evaluation of said intermediate results.

The wording "freeze command" refers to stopping the loading into the buffer. The wording "freeze time" refers to the period of time during which the loading is stopped and the processing may be implemented. The wording "frozen buffer" refers to the buffer during the freeze time and so on.

Other aspects and advantages of the invention will be apparent from the following description and the appended claims.

DETAILED DESCRIPTION

The present disclosure relates to an image processing system and method that may allow notably computationally intensive video processing, that cannot run in real-time, to be performed online, upon demand and during a given amount of time on a frozen set of images taken from a video stream acquired in real time by an acquisition device.

In a basic, not frozen, mode of operation, a video acquisition device acts as an input for the system. Real-time video processing may be performed and the data can be displayed and recorded. In the meantime, the data is queued in a buffer which may be a first in first out (FIFO) finite buffer.

Upon activation of a freeze command, data coming from the video acquisition device may continue in the potential real-time video processing, recording and display pipeline but may not be queued in the FIFO buffer anymore. Namely, the FIFO buffer is frozen. In the meantime, the computationally intensive algorithm of interest may start working on the frozen buffer and may continue until the freeze command is deactivated.

Computationally intensive algorithm are generally incremental algorithm and are processed in several steps, each steps giving intermediate results. For example, incremental algorithm may be iterative meaning that after some initialization, an intermediate result is enhanced at each iteration. Each time such an enhanced processing intermediate result becomes available, the proposed system may display the result and record it.

In general, it is not possible to predict which intermediate result of the incremental algorithm might be considered as good enough to stop the processing. Therefore, each intermediate result has to be evaluated based on at least one of a quantitative criteria, a subjective criteria and a human criteria in order to know if the processing has to be carried on.

Specific embodiments of the present disclosure will now be described in detail with reference to the accompanying Figures.

Figure 1:
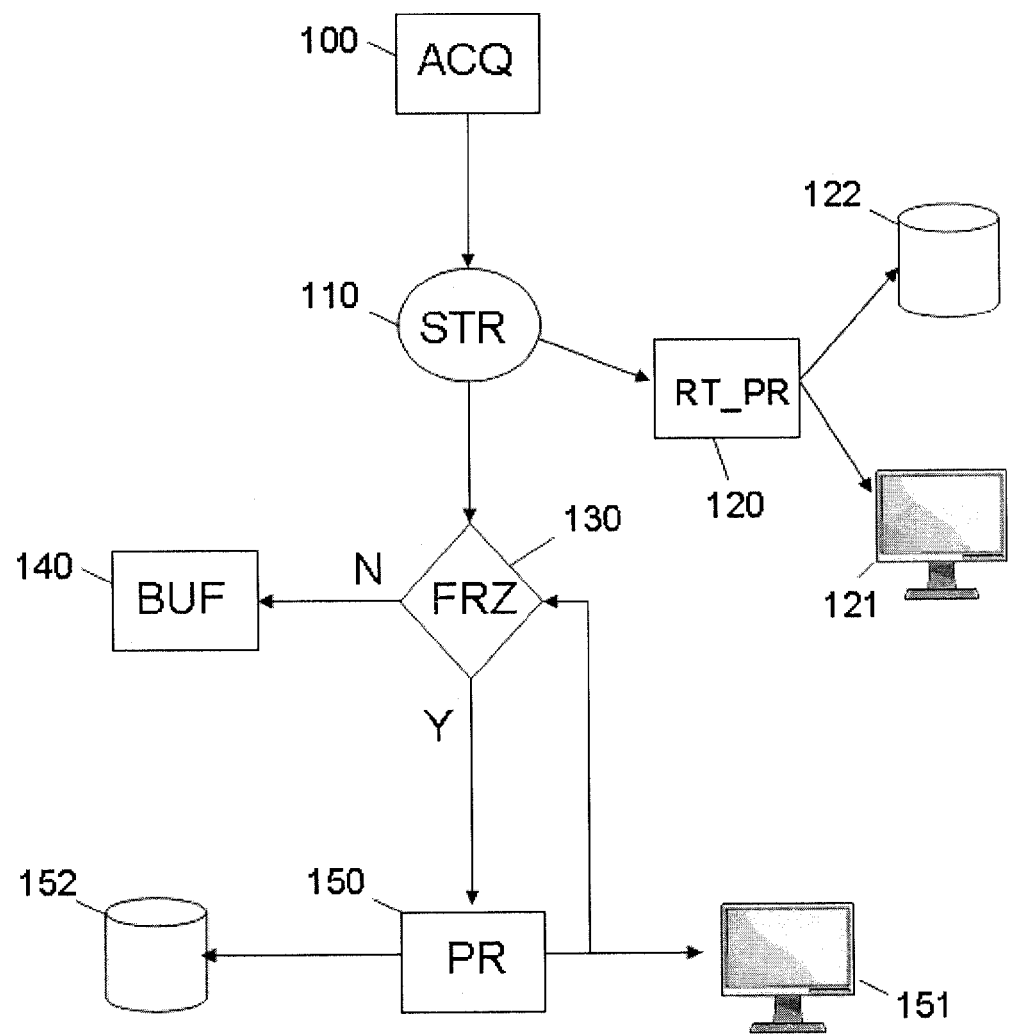
FIG. 1 is a diagram representing schematically steps of a method according to an embodiment of the present disclosure.

FIG. 1 illustrates several steps of a method according to an embodiment of the present disclosure. Once the video acquisition device has started (step 100), the video processing system receives an image stream from the video acquisition device (step 110). The image stream may be processed in real-time in step 120. Both the original data and the real-time processed one may be displayed (step 121) and stored (step 122). A freeze test is then performed (step 130). If the system is not in frozen mode (arrow N), the images are loaded into a buffer (step 140). If the system is turned to freeze mode (arrow Y), new images do not enter the buffer anymore and the computationally intensive algorithm of interest starts processing the set of buffered images (step 150). Computationally intensive algorithms may work in an incremental manner and provide intermediate results at each completion of a step. At each completion of a step in the algorithm, the system may check whether it is still in freeze mode or not. If the system is still in freeze mode, a new processing step may be launched, otherwise the algorithm is stopped and the images loading into the buffer is resumed (step 140). In both cases, intermediate results of the algorithm may also be displayed (step 151) and/or stored (step 152).

The display may be done on a motion picture display and the like. Several such devices may be used to display the different video streams. The different streams might also be combined onto a single display device. Simple juxtaposition or advanced image fusion techniques might be used.

The storage and the FIFO buffer may be located on a local or remote disk storage, a memory device and the like. When the system is in the default not-frozen mode, the original or real-time processed images are queued in a bounded FIFO buffer. If the FIFO buffer is not yet at full capacity, the new images are simply appended to the FIFO buffer. If the FIFO buffer is already full, the new images will replace the oldest one. The actual capacity bound of the FIFO buffer may be chosen by the user or by the system or may simply be defined by hardware constraints.

In an embodiment, a user monitors the original or real-time processed image stream displayed on a display device. When said user sees an interesting scene and decides that an image processing should be run, he may for example press a button that may for example be located on the acquisition device, triggering the freeze mode. Going back to the default not frozen mode might be triggered for example by releasing the button, pushing another button, automatically after a given amount of time and the like. Freeze mode might also be automatically or semi-automatically activated or deactivated based on a decision made by another processing algorithm. Such algorithm may be for example a motion detection algorithm as disclosed in U.S. Pat. Nos. 4,901,143 and 5,270,810. These algorithms may be coupled in order to activate the freeze mode when a motion on an image stream goes from smooth to erratic.

A computationally intensive algorithm simply aims at extracting useful information from a frozen images set buffer. Thanks to a continuing increase in the available practical computing power, the complexity of algorithms available for image processing tasks has become higher. Advanced processing is now possible in real-time or with some latency. Despite these advances, there will always be a gap between the actual available computing power and the computing power required to run some interesting cutting-edge processing algorithms on the fly. Because of hardware constraints, extracting an interesting information from a set of images may not always be completed within the time that separates two frames coming from an acquisition device. In an embodiment some scenarios, being able to run a cutting-edge computationally-intensive processing algorithm during video acquisition may allow the development of new applications. Users are interested in the possibility of using selectively such a cutting-edge algorithm that may not be run in real-time nor in lagged-time.

Because of hardware constraints, the time required to automatically extract the information of interest from the set of images in the buffer could not be completed in the time that separates two frames coming from the acquisition device. In an embodiment, a computationally intensive algorithm may use a frozen set of image to produce a new enhanced image or a new enhanced set of images and does it in an iterative manner.

Figure 2:
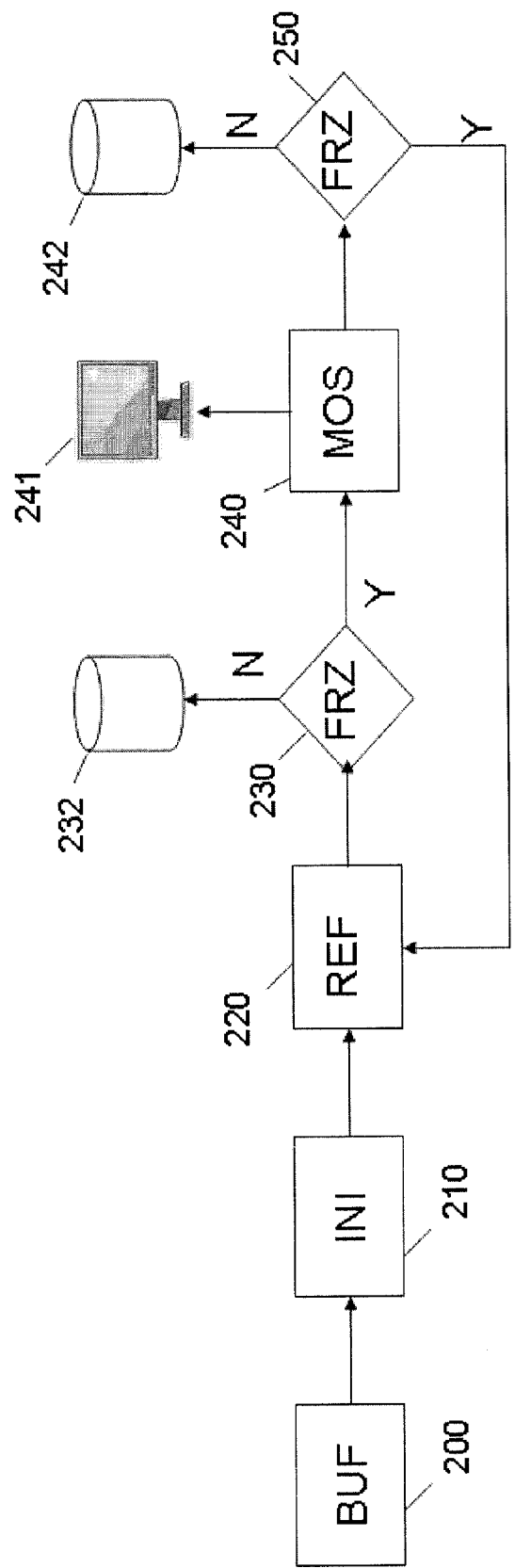
FIG. 2 is a diagram representing schematically steps of a method implementing video sequence mosaicing incremental algorithm according to an embodiment of the present disclosure.

FIG. 2 illustrates several steps of a method implementing video sequence mosaicing incremental algorithm according to an embodiment of the present disclosure. Vercauteren et al.

showed potential benefits of using dedicated video mosaicing techniques to widen the field of view by aligning and fusing many consecutive images from a video sequence, for example in the context of endomicroscopy. This mosaicing algorithm may not be run in real-time and works by iteratively refining a mosaic image. It can thus clearly benefit from the present invention. In further detail, still referring to FIG. 2, upon activation of freeze mode, the images loaded into the buffer are frozen (step 200), meaning that the loading of images into the buffer is stopped. Then, the loaded images (also referred to as frozen images) may first go through an initialization and preprocessing step 210. This step might for example consist of automatically choosing a subset of the images in the FIFO buffer so that the remainder of the mosaicing algorithm may assume that all consecutive frames in the subset are overlapping. This may be done by performing a fast but rough initial registration. A threshold on a quantitative evaluation of the quality of the rough registration can be used to define the subset of overlapping images. Afterwards the following steps may be performed in an iterative manner. Registration results are refined (step 220). A freeze test is then performed (step 230) in order to determine if the system is still in freeze mode. If the system has been switched back to the default not frozen mode (arrow N), registration results might be stored and the processing is halted (step 232). Otherwise, a mosaic image is constructed (step 240) and displayed (step 241). A freeze test is then performed (step 250). If the system has been switched back to the default not frozen mode (arrow N), the reconstructed mosaic might be stored (step 242) and the processing is halted. Otherwise, a new refinement step is performed and the process is performed in an iterative manner.

Figure 3:
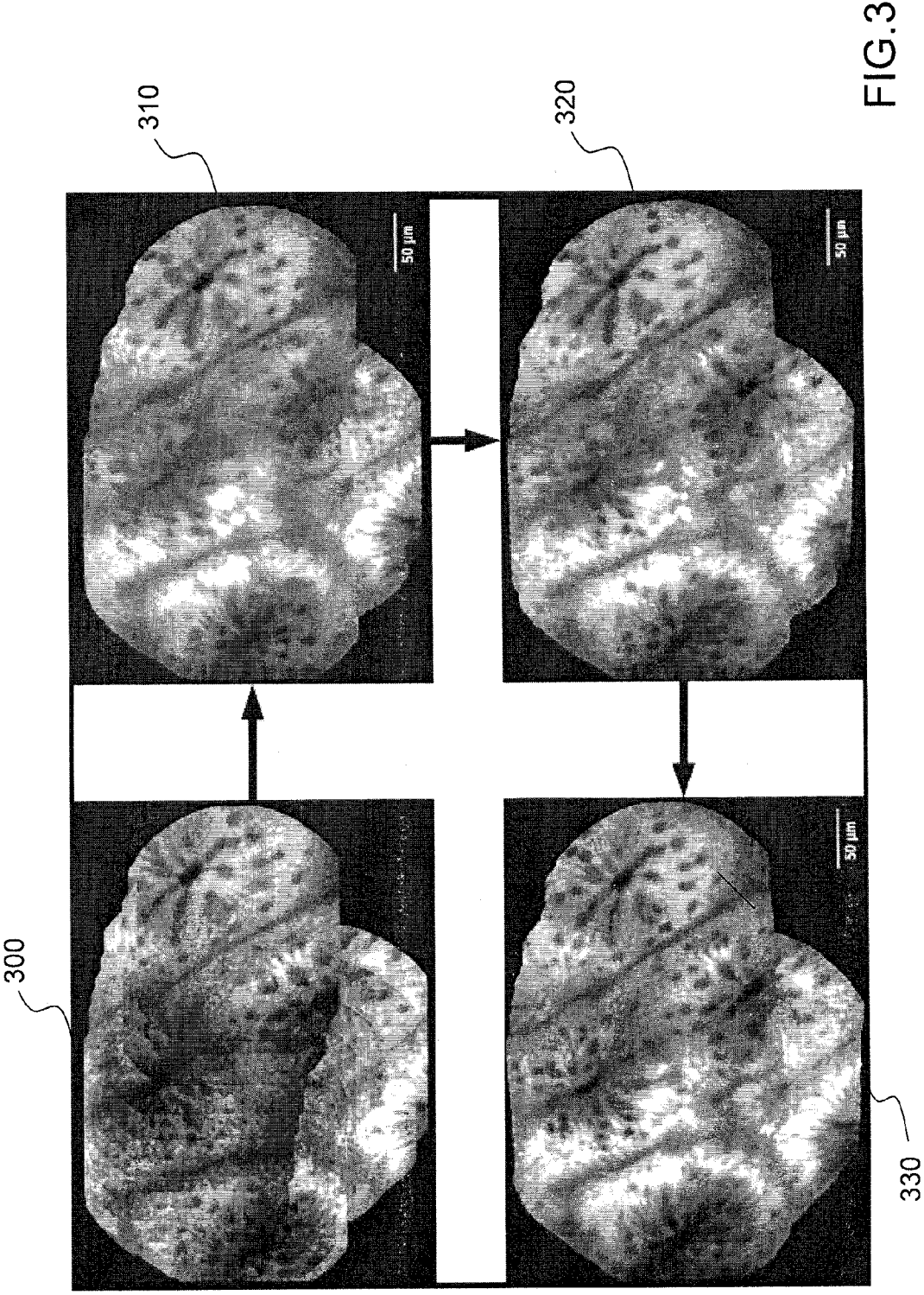
FIG. 3 is a display illustrating successive results of a video sequence mosaicing incremental algorithm according to an embodiment of the present invention.

FIG. 3 is a display illustrating successive results of a video sequence mosaicing incremental algorithm according to an embodiment of the present invention. It highlights incremental improvement of an image mosaic as computed, during a freeze time period. The mosaicing algorithm may be run on a plurality of frames (for example 26 frames) of a healthy human colon acquired in vivo by means of endomicroscopy. Initial alignment may be rather rough and the image mosaic may be a simple image overlay (image 300). Then a globally consistent alignment may computed (image 310) and a state-of-the-art image fusion technique may used. This may be followed by a mosaic that takes into account motion distortion that alters endomicroscopy (image 320). Finally a mosaic compensating for non-rigid deformations due to interactions between the imaged soft tissue and an optical probe of an endomicroscope may be constructed (image 330).

Figure 4:
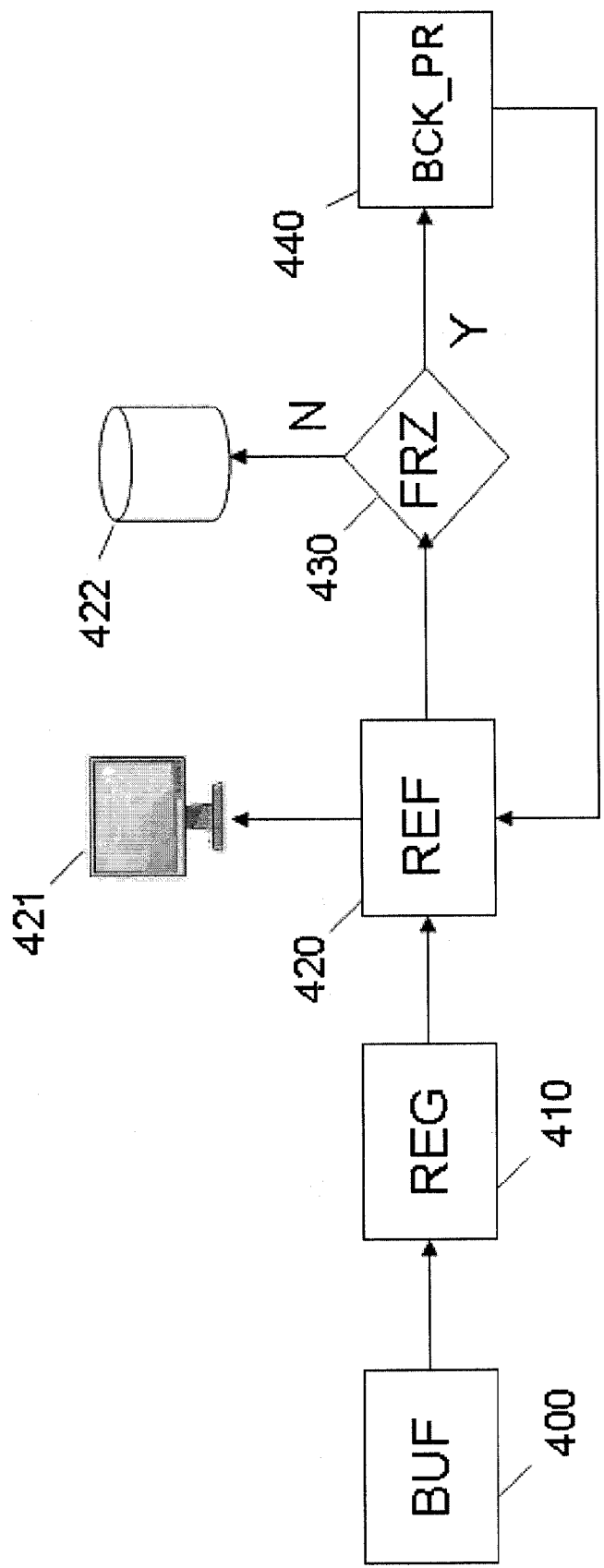
FIG. 4 is a diagram representing schematically steps of a method implementing a super-resolution incremental algorithm according to an embodiment of the present disclosure.

FIG. 4 is a diagram representing schematically steps of a method implementing a super-resolution incremental algorithm according to an embodiment of the present disclosure. Patent Application US20070273930 showed potential benefit of creating a high resolution image from a set of shifted images, for example in the context of endomicroscopy. Besides a mechanical device presented there to shift images, super-resolution might also be done from uncontrolled motion images. As presented by Irani and Peleg, typical super-resolution algorithms are iterative in nature and require a large amount of processing power. In further detail, still referring to FIG. 4, upon activation of the freeze mode, the images loaded into the buffer are frozen (step 400). The freezed set of images may be then registered onto a given reference (step 410). The alignment might be imposed by the mechanical constraints as in US Patent Application US20070273930 or might be the results of some image registration algorithm. From this alignment a high-resolution image is constructed in step 420, and displayed in step 421. A freeze test is then performed in step 430. If the system has been switched back to the default not frozen mode (arrow N), the reconstructed high-resolution image might be stored (step 422) and the processing is halted. Otherwise (arrow Y), low-resolution images are simulated from the current high-resolution image and knowledge of the imaging system in step 440. The error between the simulated low-resolution images and the actual original low-resolution images is used to improve the current high-resolution image by a back-projection technique, going back to the step of constructing an high resolution image.

Figure 5:
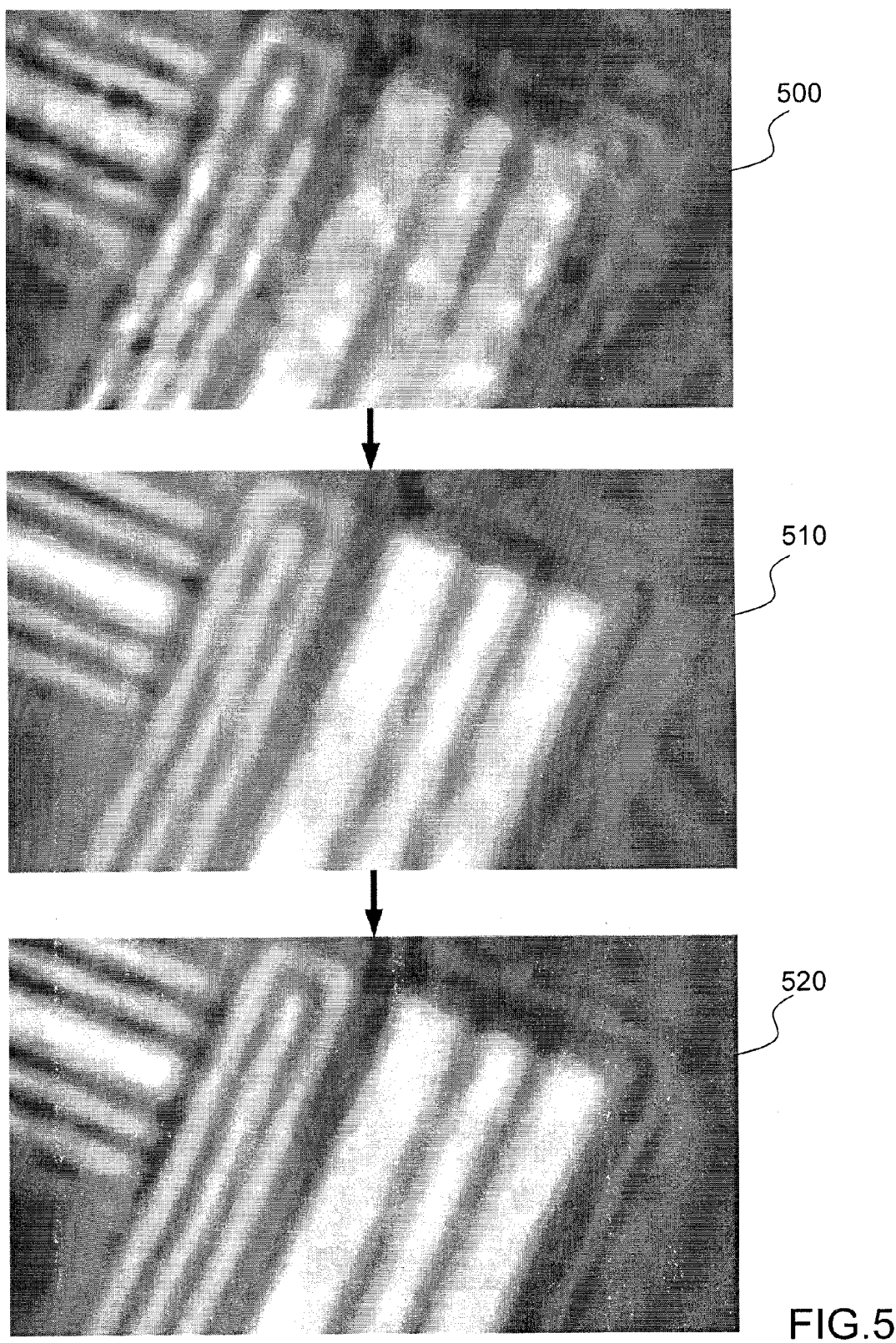
FIG. 5 is a display illustrating successive results of a super-resolution incremental algorithm according to an embodiment of the present disclosure.

FIG. 5 is a display illustrating successive results of a super-resolution incremental algorithm according to an embodiment of the present disclosure. An image from a frozen set of images is chosen and upsampled to provide an approximation of an high-resolution image (image 500). A first and second successive results of iterative improvements are shown (respectively images 510 and 520).

Figure 6:
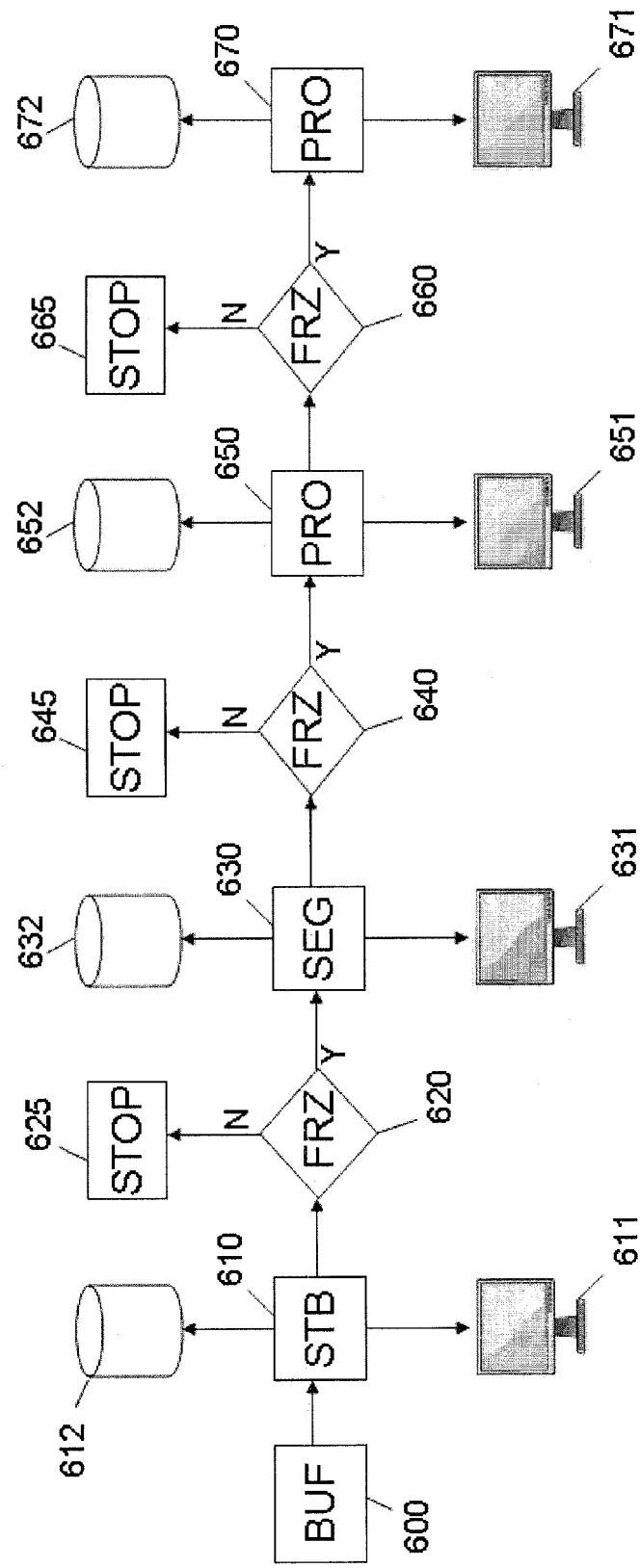
FIG. 6 is a diagram representing schematically steps of a method implementing blood velocity measurement incremental algorithm according to an embodiment of the present disclosure.

FIG. 6 is a diagram representing schematically steps of a method implementing blood velocity measurement incremental algorithm according to an embodiment of the present disclosure. US Patent Application US20080045848 showed potential benefits of measuring blood velocity from a set of images, for example in the context of endomicroscopy. As presented by Perchant et al., blood velocity computation might be done by a pipeline of processing algorithms that work on a set of consecutive images. The complete processing may require a large amount of processing power. Even though the pipeline is not strictly speaking iterative, it is still incremental. Results of each subcomponent of this pipeline can be of interest to the user. In further detail, still referring to FIG. 6, upon activation of the freeze mode, the images loaded into the buffer are frozen (step 600). A region of interest within one given image may be automatically tracked and stabilized across the set of frozen images (step 610) resulting in a set of stabilized images. The initial region of interest might be defined by the user, automatically selected by another processing algorithm such as a salient region detector, or might consist of the complete image. Stabilization results might be stored (step 612) and/or displayed (step 611). A freeze test may be performed (step 620). If the system has been switched back to the default not frozen mode (arrow N), processing is simply halted. Otherwise (arrow Y), a mean image is computed from the stabilized region of interest sequence to improve the signal to noise ratio and a vessel segmentation algorithm is performed on the mean stabilized image (step 630). Segmentation results might be displayed (step 631) and stored (step 632). A freeze test may be performed (step 640). If the system has been switched back to the default not frozen mode (arrow N), processing is simply halted. Otherwise (arrow Y), segmentation is propagated to all images in the set of stabilized images (step 650). Segmentation propagation might be displayed (step 651) and/or stored (step 652). A freeze test may be performed (step 660). If the system has been switched back to the default not frozen mode (arrow N), processing is simply halted. Otherwise (arrow Y), blood velocity is computed within the detected vessels by a dedicated processing algorithm such as a medial line correlation method (step 670). Finally the estimated blood velocity is displayed (step 671) and/or stored (step 672).

Figure 7:
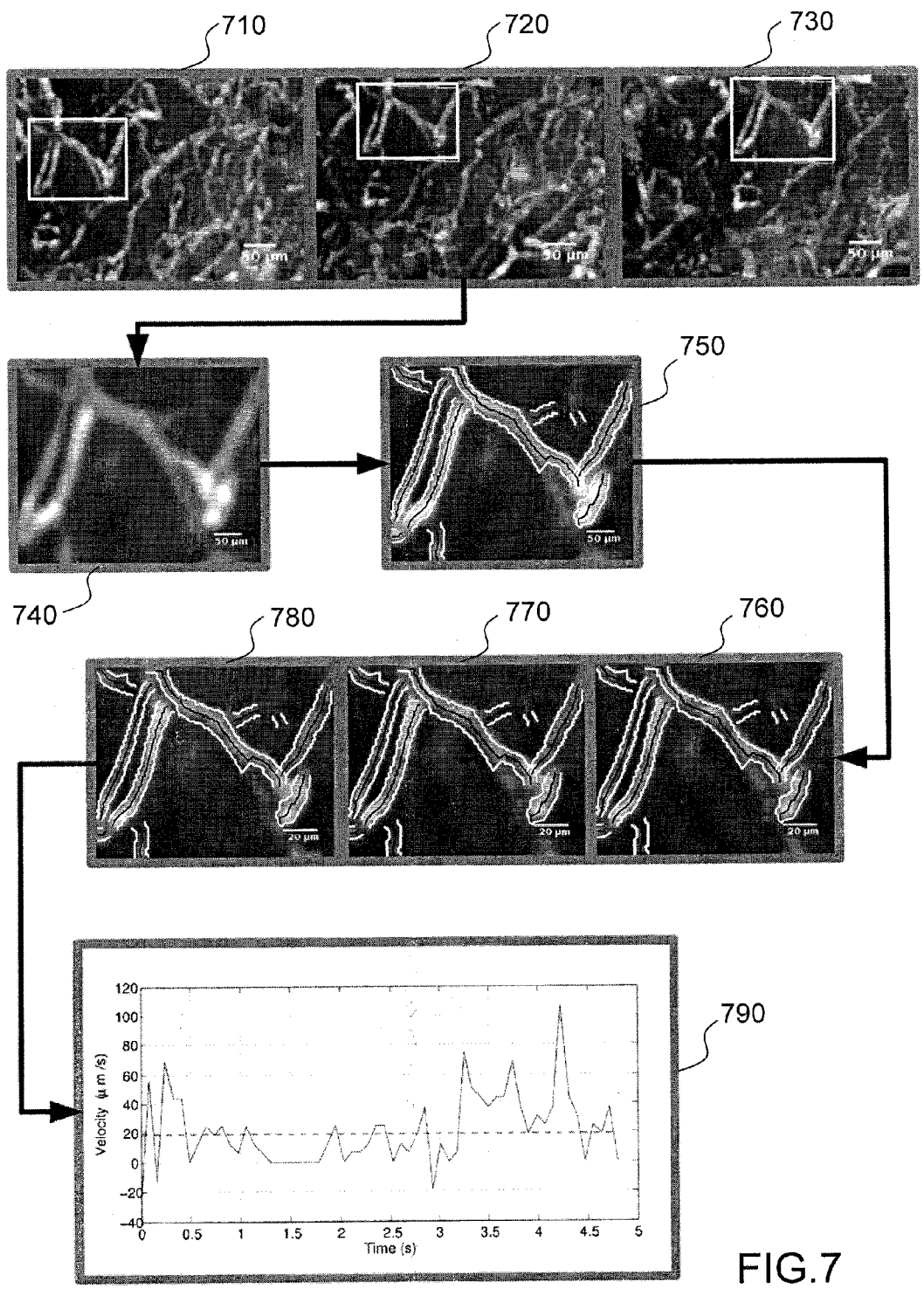
FIG. 7 is a display illustrating successive results of a blood velocity measurement incremental algorithm.

FIG. 7 is a display illustrating successive results of a blood velocity measurement incremental algorithm. It highlights progression through blood velocity measurement processing pipeline as computed by the previously described possible embodiment. A given region of interest is tracked and stabilized through a sequence in a frozen buffer (images 710, 720 and 730). Then, a stabilized mean region of interest image is shown and used to segment the vessel structure present in the region of interest (images 740 and 750). In the following step, the segmentation is propagated to the stabilized region of interest sequence (images 760, 770 and 780). Finally a graph representing the estimation of blood velocity though the freezed sequence as a function of time is displayed (image 790).

In a typical clinical use of endomicroscopy according to the prior art, endoscopic and endomicroscopic images are displayed to a user on separated displays. Generally, the microscopic imaging probe is visible on the macroscopic endoscopic view. It may be of clinical interest to fuse the two sources of information and show the microscopic images within their macroscopic context. However, the image processing to fuse the flow of macroscopic and microscopic images cannot be run in real time.

Figure 8:
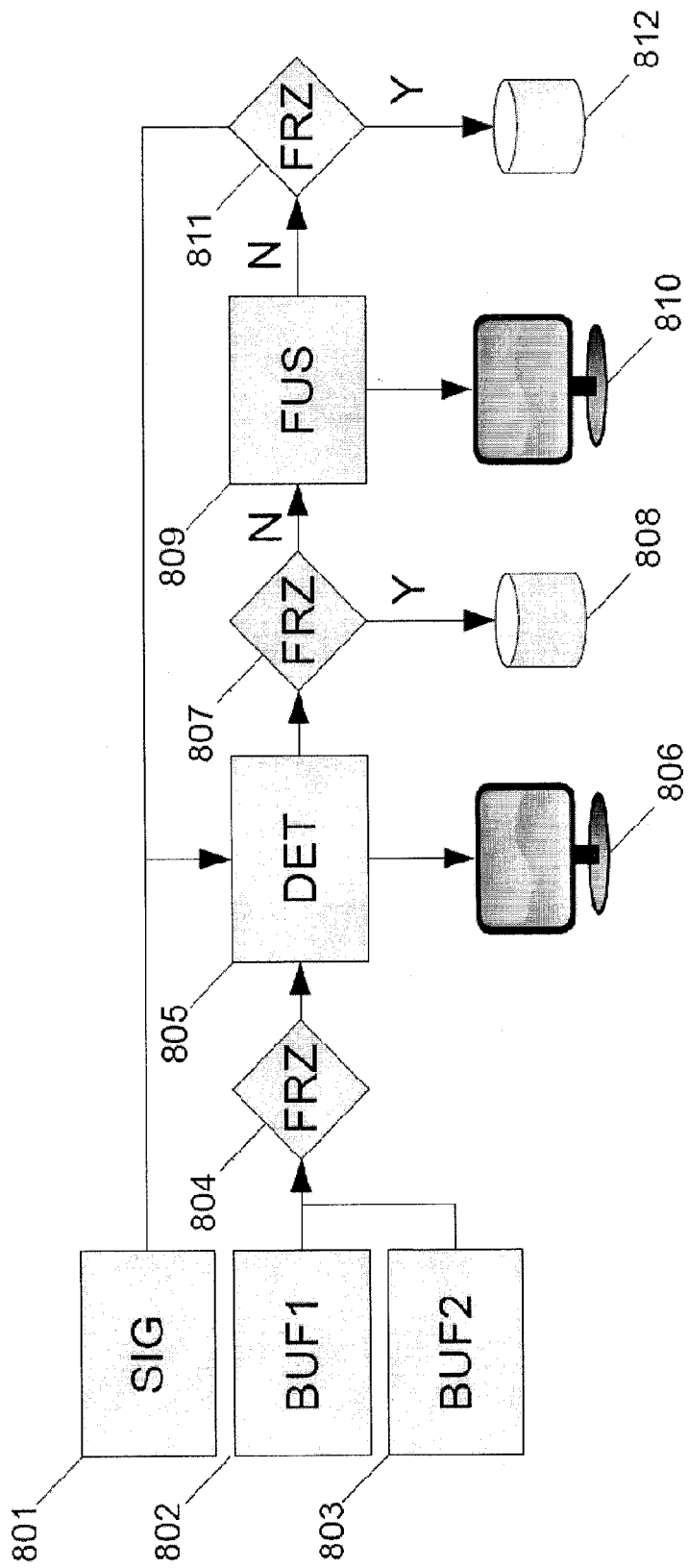
FIG. 8 is a diagram representing schematically steps of a method implementing an image fusion incremental algorithm according to an embodiment of the present disclosure.

According to an embodiment of the present disclosure, it may be possible to fuse information from several acquisition devices. FIG. 8 illustrates several steps of a method used to fuse images. For example a first flow of images may be acquired on a first acquisition device and a second flow of images may be acquired on a second acquisition device. The first and second acquisition devices may be mechanically coupled so as to acquire images of the same object under observation. In an embodiment, the first and second acquisition devices may be an endoscope and an endomicroscope inserted in an accessory channel of the endoscope so as to acquire simultaneously microscopic and macroscopic images.

More precisely and still referring to FIG. 8, in an embodiment images acquired by the endomicroscope (first acquisition device) may be loaded in a first buffer (step 802) while images acquired by the endoscope (second acquisition device) may be loaded in a second buffer (step 803).

During the acquisition, images from the first and second acquisition devices may be displayed. The user may select, during the ongoing acquisition, one or more interesting images of the second flow of images (macroscopic images from the endoscope) associated with one or more images of the first flow of images (microscopic images from the endomicroscope). The associated images of the first flow of images may temporally correspond to the selected images of the second flow of images. The selection may be carried out for example by clicking on a button (step 801). The system may store timings, called interest signals, enabling to retrieve the selected images from the buffer. Alternatively, interesting images among the first and second set of images may be selected automatically by an algorithm among the images stored in the first and second buffers. For example, one image out of ten may be automatically selected in the first and second buffers.

In another embodiment, when the freeze command is activated and the first and second buffer are frozen, the user may also select images among the first or second sets of images loaded in the first and second buffers. For example, the user may review the sets of images loaded in the first and/or second buffers by displaying said images on a display unit. For example, an image from the first or second sets of images loaded in the frozen buffers may be selected when the image is displayed for more than a predetermined amount of time.

As described in the previous embodiments, the user may decide that an image processing should be run. Therefore, the user may for example press a freeze button, triggering the freeze mode. Entering the freeze mode may stop the loading of images in the first and second buffers. When the image selection step is completed and the freeze command is activated (step 804), the system may perform a detection step (step 805) on one of the selected image. The detection may comprise detecting the endomicroscopic probe on one selected image of the second set of images (i.e. macroscopic images) to obtain a macroscopic processed image. The detection result may be displayed (step 806). A freeze test may then be performed (step 807). If the system is not in freeze mode, the detection results may be stored (step 808). If the system is in freeze mode, the system proceeds and fuses the image of the first set of image (microscopic image) temporally corresponding to the macroscopic selected processed image (step 809). The fused result may be displayed (step 810). The microscopic image may be positioned next to the position at which the endomicroscopic probe has been detected. Alternatively, advanced texture mapping technique may be used. A freeze test may performed (step 811) and the system may either store the fusion result and bails out (812) or proceeds according to the above mentioned process with another selected image.

In an embodiment, a plurality of microscopic images may be fused on a macroscopic image (step 905). This may be performed by propagating information resulting from one or more fusions between macroscopic and microscopic corresponding images onto a main macroscopic image. Endoscopic images have a large field of view compared to endomicroscopic images. Therefore, several microscopic images may potentially be fused on a macroscopic image. Fusing a supplementary microscopic image on a macroscopic image may preliminary require that the supplementary microscopic image is fused to a corresponding second macroscopic image according to the previously described scheme.

Figure 9:
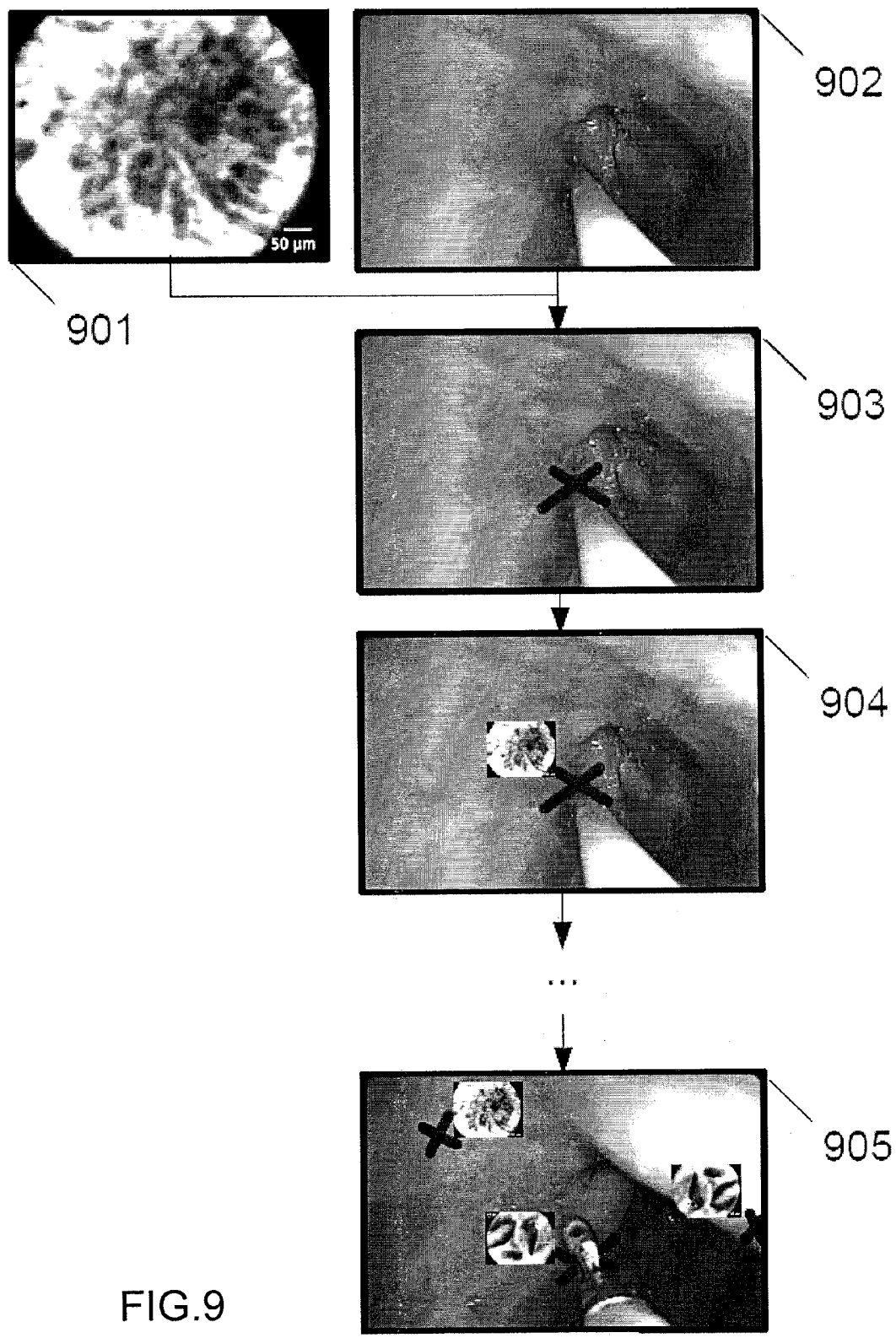
FIG. 9 is a display illustrating successive results of an image fusion incremental algorithm according to an embodiment of the present disclosure.

FIG. 9 is a display illustrating successive results of a fusion algorithm according to an embodiment of the present disclosure. An endoscopic image of interest is selected for processing (step 902), the endomiscroscopic probe is detected and the tip of the probe is displayed (step 903). A fusion according to the previously described scheme is performed to show the microscopic image associated to the endoscopic image (step 901) in the macroscopic context (step 904). Further processing steps are then performed and step 905 illustrates the result of fusing several endomicroscopic images of interest on a macroscopic image.

While the invention has been described with respect to a limited number of embodiments, those skilled in the art, having benefit of this disclosure, will appreciate that other embodiments can be devised which do not depart from the scope of the invention as disclosed herein. For example, the images referred to in the description may be multi spectral images acquired on a plurality of collection channels of an acquisition device. Accordingly, the scope of the invention should be limited only by the attached claims.

What is claimed is:

1. A method for online processing of images, comprising:
acquiring images through a medical device in real-time;
displaying the images in real-time;
loading the images into a buffer obtaining a set of images;
stopping the loading of the images into the buffer based on an evaluation of the real-time displayed images;
processing the loaded set of images using an incremental algorithm, wherein the incremental algorithm is composed of different subroutines that need to be run one after another and which provide intermediate results;
displaying successively the intermediate results obtained by processing the set of images; and
resuming the loading, and stopping the processing, based on an evaluation of said intermediate results, wherein acquiring and displaying the images in real-time is continued upon stopping the loading of images into the buffer.

2. The method according to claim 1, wherein the acquired images are derived from a video sequence and wherein the processing comprises iteratively aligning and fusing consecutive images in order to widen the field of view.

3. The method according to claim 1, wherein the acquired images are shifted images and the processing comprises iteratively registering said images in order to obtain a high resolution image.

4. The method according to claim 1, wherein the acquired images are derived from a video sequence representing blood vessels and the processing computes blood velocity.

5. The method according to claim 1, wherein the loading is stopped automatically.

6. The method according to claim 5, wherein the loading is stopped based on a motion detector algorithm.

7. The method according to claim 1, wherein the evaluation of the intermediate results is operated by a user or automatically.

8. The method according to claim 1, wherein the buffer is a FIFO buffer.

9. The method according to claim 1, wherein the intermediate results are stored on a storage device.

10. The method according to claim 1, wherein the intermediate results of the processing are merged to the real-time displayed images.

11. The method according to claim 1, wherein the medical device is a fiber confocal microscope.

12. An imaging system comprising:
a medical device for acquiring images in real-time;
a display device for displaying the images in real-time;
a storage device comprising a buffer for loading said images;
a freeze command to stop the loading of the images into the buffer upon activation; and
a processor for processing images,
wherein, upon activation of the freeze command:
the processor processes loaded images using an incremental algorithm, wherein the incremental algorithm is composed of different subroutines that need to be run one after the other and which provide intermediate results,
the display device displays successively the intermediate results of said algorithm,
the medical device and display device continue to acquire and display in real time the images, and
the loading of images into the buffer is resumed, upon deactivation of the freeze command, based on an evaluation of said intermediate results.

13. The system according to claim 12, wherein the stopping of the loading into the buffer is based on an evaluation of said real-time displayed images.

14. The system according to claim 12, wherein the medical device is a fiber confocal microscope.

15. The method according to claim 1, wherein the medical device comprises a first acquisition device and a second acquisition device and the buffer comprises a first buffer and a second buffer for respectively loading the images acquired on the first and second acquisition devices and wherein the processing comprises fusing one or more images loaded in the first buffer on an image loaded in the second buffer.

* * * * *